S. G. FITZSIMONS.
AUTO FENDER.
APPLICATION FILED MAR. 27, 1922.

1,430,224.

Patented Sept. 26, 1922.
2 SHEETS—SHEET 1.

WITNESSES

INVENTOR
S. G. Fitz Simons,
BY
ATTORNEYS

S. G. FITZSIMONS.
AUTO FENDER.
APPLICATION FILED MAR. 27, 1922.

1,430,224.

Patented Sept. 26, 1922.
2 SHEETS—SHEET 2.

WITNESSES

INVENTOR
S. G. FitzSimons

BY
ATTORNEYS

Patented Sept. 26, 1922.

1,430,224

UNITED STATES PATENT OFFICE.

SAMUEL G. FITZ SIMONS, OF CHARLESTON, SOUTH CAROLINA.

AUTO FENDER.

Application filed March 27, 1922. Serial No. 547,077.

*To all whom it may concern:*

Be it known that I, SAMUEL G. FITZ SIMONS, a citizen of the United States, and resident of Charleston, in the county of Charleston and State of South Carolina, have invented certain new and useful Improvements in Auto Fenders, of which the following is a specification.

This invention relates to fenders, especially adapted for application to automobiles and is an improvement over the construction illustrated in my co-pending application S. N. 542,396 filed March 9, 1922.

As in the case of my co-pending application an important object of this invention is to provide an automobile fender or pick-up device having simple means whereby the same is opened upon striking a person thereby picking up the person without serious injury.

A further object is to provide an automobile fender having simple means whereby the same is held in a set position by means of a spring, the said spring also being adapted to swing the parts to their operative positions when the bumper strikes a person.

A further object is to provide a fender for automobiles which is simple to apply, of highly simplified construction and cheap to manufacture.

A further object is to provide a fender for motor vehicles which when applied will not mar the appearance of the motor vehicle nor interfere with the operation of the same.

Other objects and advantages of the invention will be apparent during the course of the following description.

In the accompanying drawing, forming a part of this application and in which like numerals are employed to designate like parts throughout the same, Figure 1 is a perspective of the improved fender applied.

Figure 1:
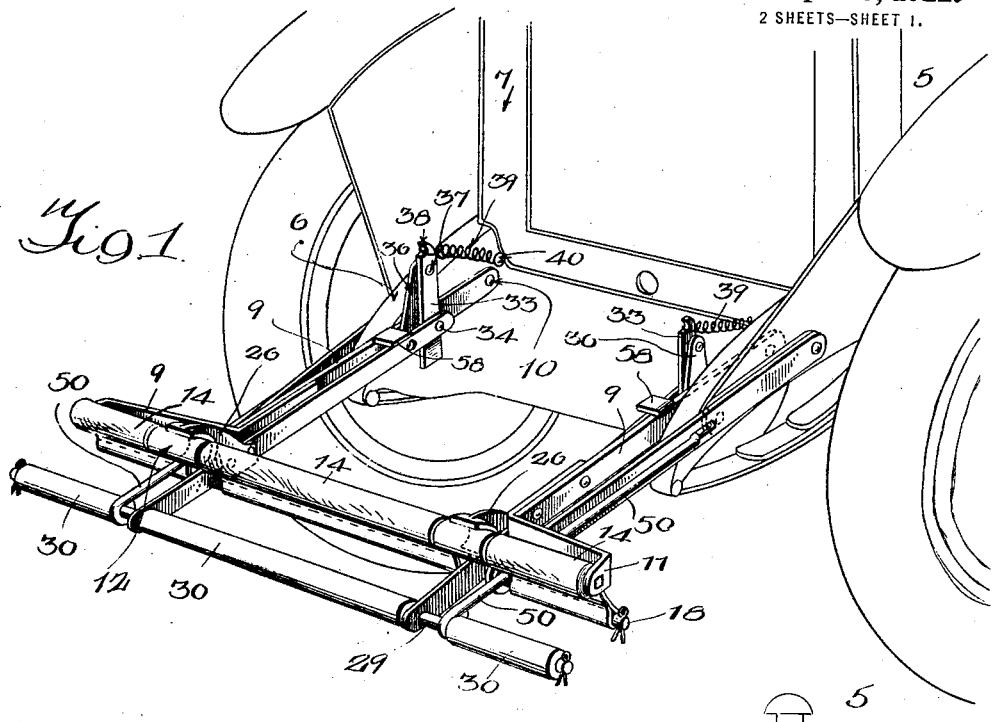
Figure 2:
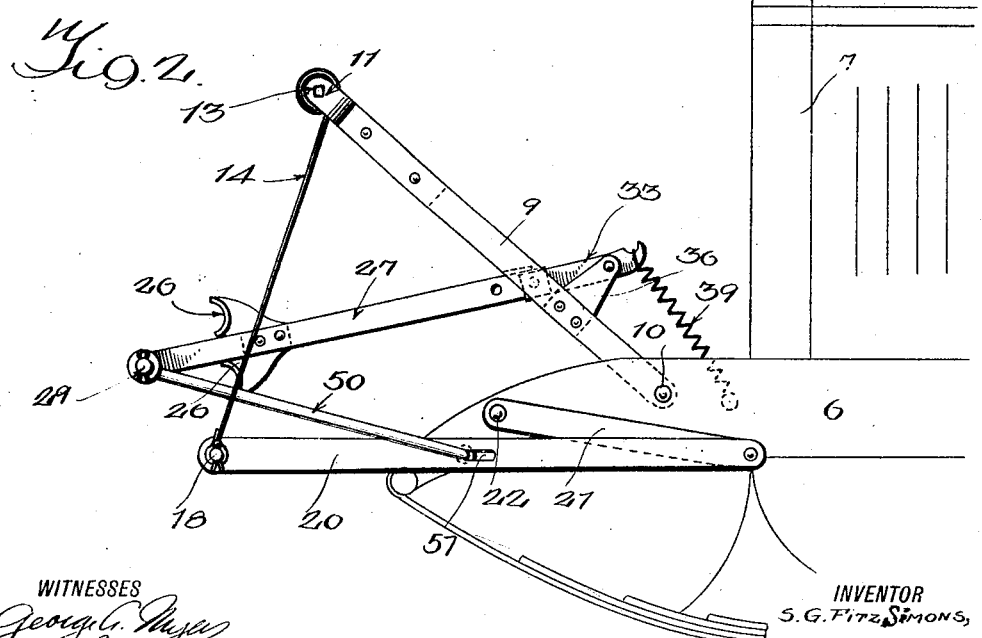
Figure 2 is a side elevation of the fender applied, the same being shown in its intermediate position or in the position it occupies between the time it is touched and the time it assumes its completely opened position.
Figure 3:
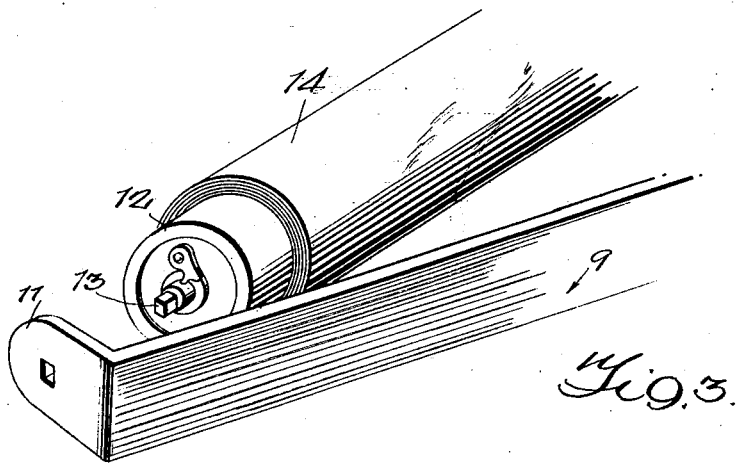
Figure 3 is a fragmentary perspective illustrating the roller and the supporting member for the same.

In the drawing wherein for the purpose of illustration is shown a preferred embodiment of the invention the numeral 5 generally designates a vehicle having a frame 6, the sides of which are, as illustrated in Figures 1 and 2 extended beyond the forward end of the radiator.

Figures 1 and 2 illustrate that the improved bumper is connected to the forwardly extended end portion of the frame 6. A pair of curtain supporting arms 9 are pivoted at their rear ends to the sides of the frame as indicated at 10 and the forward portions of the arms 9 are extended outwardly to form ears 11 to which the curtain rod 12 is connected. The curtain rod 12 is constructed similar to an ordinary shade roller and is provided at one end with a pintle rotatably connected to the adjacent ear 11 and at its other end with a squared pintle 13 snugly received within the squared opening in the other ear 11. A plurality of curtains or pick-up sheets 14 are trained about the roller 12 and are opened out when a person is struck by the bumper so as to form a means to pick the person up and prevent injury.

Figure 4:
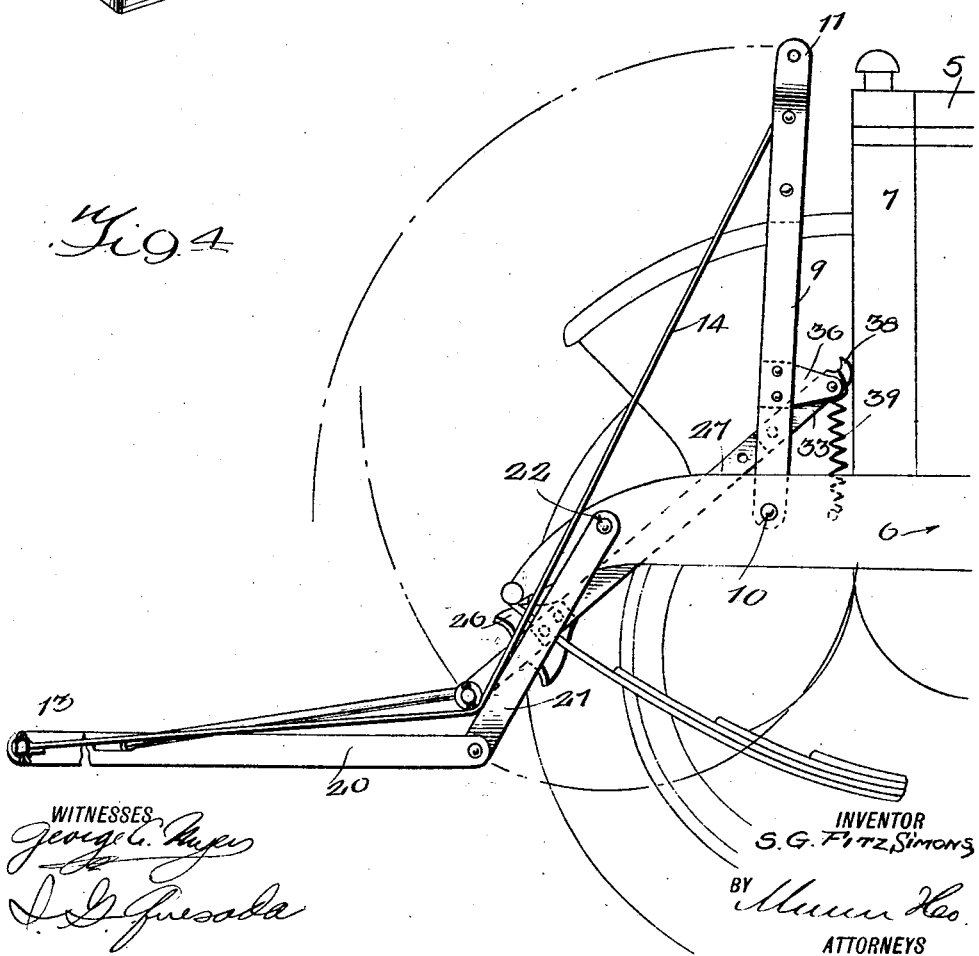
Figure 4 is a side elevation of the fender completely opened.

The lower ends of the several curtains 14 are securely connected to a lower curtain rod 18 carried by a pair of lower arms 20 which are as illustrated in Figures 2 and 4 pivoted at their rear ends to supporting links 21. The supporting links 21 of which there are two are in turn pivoted to the extended portions of the frame as indicated at 22.

When the device is in its inoperative position or is set for use the upper and lower rollers or curtain supporting members 12 and 18 occupy the positions illustrated in Figure 1, wherein the holding fingers 26 are shown engaged with the same. The holding fingers 26 are arranged in pairs and extend upwardly and downwardly from the bumper supporting arms 27 of which there are two. When the bumper supporting arms 27 are in their advanced positions, the forwardly directed curved fingers 26 engage the members 12 and 18 and thereby hold the same in the position illustrated in Figure 1.

The forward ends of the arms 27 have a bumper bar 29 about which contact rollers 30 are arranged. It will be seen that the bumper bar 29 is arranged in advance of the other members or parts of the apparatus and therefore when the apparatus strikes a person the bumper bar 29 will be moved rearwardly for imparting a corresponding movement to the bumper supporting arms 27.

The bumper supporting arms 27 have pivotal connection at their rear ends with levers 33 through the medium of pivot elements 34. The levers 33 are in turn pivoted adjacent their upper ends to brackets 36 as indicated at 37. The levers are formed with hooks 38 to which the forward ends of coiled springs 39 are connected. The coiled springs 39 are in turn anchored into the vehicle at their rear ends, as indicated at 40 and the coiled springs exert a constant forward tension on the bumper supporting arms 27 so that the forwardly directed fingers 26 are maintained in engagement with the rods 12 and 18.

With the forwardly directed fingers thus urged into engagement with the rods 12 and 18 the apparatus is held in the position illustrated in Figure 1 and when the bumper bar 39 is moved rearwardly to contact with the person the fingers 26 will also be moved rearwardly thereby releasing the upper and lower rods 12 and 18 respectively.

Figure 2 clearly illustrates that the brackets 36 are rigidly secured to the upper curtain supporting arms 9 and when the bumper supporting arms 27 are released from engagement with the upper and lower rods 12 and 18 the coiled springs will act to draw the curtain supporting arms 9 upwardly to cause the same to first assume the position illustrated in Figure 2 and then the position illustrated in Figure 4. That is to say, the apparatus is first in the position illustrated in Figure 1 and then opens up until it assumes the position illustrated in Figure 4, all by the tension of the coiled springs 39.

Attention is directed to the fact that the coiled springs 39 of which there are two, not only serve as a means for urging the fingers 26 into engagement with the bars 12 and 18 but also as a means for moving the upper curtain supporting arms 9 to their elevated positions, as illustrated in Figure 4. When the lower arms 20 are released the same will drop by force of gravity to the position illustrated in Figure 4 wherein the hanger bars 21 are shown as being extended downwardly from the pivot elements 20.

When the contact bar or bumper bar 29 is moved rearwardly it imparts a corresponding movement to a pair of links 50 having their rear end portions directed inwardly and received within slots 51 in the intermediate portions of the curtain supporting arms 20. As the bumper supporting arms 29 move upwardly and rearwardly the links 50 will be moved rearwardly and downwardly so as to move the arms 20 downwardly and then forwardly so as to cause the same to occupy the positions illustrated in Figure 4.

In operation the parts are positioned as illustrated in Figure 1 and when a person is struck by the contact or bumper bar 29 the same is moved rearwardly, thereby imparting a corresponding movement to the bumper supporting arm 27. This movement thus imparted to the arms 27 releases the fingers 26 from locking engagement with the upper and lower rods 12 and 18 whereupon the springs 39 promptly swings the levers 33 and draws the same rearwardly for imparting a corresponding movement to the arms 9 whereupon the curtain is opened up to form a receiver for the person struck. The arms 9 may be provided with lugs 58 arranged in the path of travel of the levers so as to limit the movement of the same.

A bumper constructed in accordance with this invention may be conveniently applied to a vehicle without marring the appearance of the same or without necessitating alterations to the vehicle. Of course the contact bar 29 and the several curtains which are arranged on opposite sides of the members 9, 20 and 27 are of sufficient width to extend to the wheels so that a person cannot be run over if the apparatus properly functions.

Having thus described the invention, what is claimed is:—

1. A bumper for automobiles comprising upper curtain supporting arms having means whereby the same may be pivotally connected to a vehicle, lower curtain supporting arms, a curtain associated with said upper and lower arms, hanger bars pivoted to said lower arms and to the vehicle, and a bumper having means whereby to hold the upper and lower arms in position.

2. An automobile bumper comprising pairs of upper and lower curtain supporting arms, rods connected to said arms, a curtain connecting said rods, bumper supporting means pivoted to said upper arms and having holding fingers adapted to engage said rods whereby to detachably hold the same in position, a bumper carried by said bumper supporting means and arranged to strike a person in the path of travel of the motor vehicle, and spring means associated with said bumper supporting means for holding said fingers in engagement with said rods and for swinging the upper arms to an elevated position when the rods are released.

3. An automobile bumper comprising pairs of upper and lower curtain supporting arms, rods connected to said arms, a curtain connecting said rods, bumper supporting means having holding fingers adapted to engage said rods whereby to detachably hold the same in position, a bumper carried by the forward portions of said bumper supporting means and arranged in advance of said rods whereby to strike a person in the path of travel of the motor vehicle, spring means associated with said bumper supporting means for holding said fingers in engagement with said rods and for swinging the upper arms to an elevated position when the rods are released, and hanger bars pivoted to the frame of the vehicle and to the rear portions of said lower arms.

4. An automobile bumper comprising pairs of upper and lower curtain supporting arms, rods connected to said arms, a curtain connecting said rods, bumper supporting means pivoted to said upper arms and having holding fingers adapted to engage said rods whereby to detachably hold the same in position, a bumper carried by said bumper supporting means and arranged in advance of said rods whereby to strike a person in the path of travel of the motor vehicle, spring means associated with said bumper supporting means for holding said fingers in engagement with said rods and for swinging the upper arms to an elevated position when the rods are released, hanger bars pivoted to the frame of the vehicle and to said lower arms and links pivoted to the forward portions of said bumper supporting means and having a limited sliding connection with relation to said lower arms, said links being adapted to move the lower arm downwardly when released.

5. An automobile bumper comprising pairs of upper and lower curtain supporting arms, the upper arms being adapted for pivotal connection with a vehicle, brackets carried by said upper arms, levers pivoted to said brackets, bumper supporting arms pivoted to the lower portions of said levers, a bumper carried by said bumper supporting arms and arranged in advance of said upper and lower curtain supporting arms, curtain supporting rods connected to the forward portions of said upper and lower arms, a curtain connected to said rods, said bumper supporting arms being provided with pairs of fingers adapted to engage said rods whereby to hold the same detachably in position, springs connected to the upper portions of said levers for urging said fingers into engagement with said rods, said springs also being adapted to swing the upper curtain supporting arms to an elevated position when released, and links connected to said bumper supporting arms and to said lower curtain supporting arms for moving the same downwardly when released.

6. An automobile bumper comprising upper and lower curtain supporting arms, the upper arms being adapted for pivotal connection with a vehicle, brackets carried by said upper arms, levers pivoted to said brackets, bumper supporting arms pivoted to the lower portions of said levers, a bumper carried by said bumper supporting arms, curtain supporting rods connected to the forward portions of said upper and lower arms, a curtain connected to said rods, said bumper supporting arms being provided with fingers adapted to engage said rods whereby to hold the same detachably in position, springs connected to the upper portions of said levers for urging said fingers into engagement with said rods, said springs also being adapted to swing the upper curtain supporting arms to an elevated position when released, and links connected to said bumper supporting arms and to said lower curtain supporting arms for moving the same downwardly when released, and hanger bars supporting said lower pair of arms for pivotal movement.

7. An automobile bumper comprising pairs of upper and lower curtain supporting arms, the upper arms being adapted for pivotal connection with a vehicle, brackets carried by said upper arms, levers pivoted to said brackets, bumper supporting arms pivoted to the lower portions of said levers, a bumper carried by the forward portions of said bumper supporting arms and arranged in advance of said upper and lower curtain supporting arms, curtain supporting rods connected to the forward portions of said upper and lower arms, a curtain connected to said rods, said bumper supporting arms being provided with pairs of upper and lower curved forwardly directed fingers adapted to engage said rods whereby to hold the same detachably in position, springs connected to the upper portions of said levers for urging said fingers into engagement with said rods, said springs also being adapted to swing the upper curtain supporting arms to an elevated position when released, links connected to said bumper supporting arms and to said lower curtain supporting arms for moving the same downwardly when released, and hanger bars supporting said lower pair of arms for pivotal movement, and lugs carried by the upper curtain supporting arms and adapted to engage said levers whereby to limit the swinging movement of the same.

8. A vehicle bumper comprising arms, a curtain supporting member having connection therewith, a curtain trained about said curtain supporting member, and a bumper arranged in advance of said curtain and having forwardly directed fingers engaging said curtain supporting member whereby to normally hold the same in an operative position.

9. A vehicle bumper comprising arms, a curtain supporting member having connection therewith, a curtain trained about said curtain supporting member, and a bumper arranged in advance of said curtain and having means engaging said curtain supporting member whereby to normally hold the same in an operative position, and a spring urging said second named means into engagement with said curtain supporting means.

10. A vehicle bumper comprising upper and lower arms, rods connected to said arms, a curtain connected to said rods, and a bumper having means for engaging said rods to normally hold the same in a set position.

11. A vehicle bumper comprising upper and lower arms, rods connected to said arms, a curtain connected to said rods, and a bumper having means for engaging said rods to normally hold the same in a set position, and a spring associated with said means and urging the holding means of the bumper into engagement with the said rods.

SAMUEL G. FITZ SIMONS.